(No Model.)

A. B. PITKIN.
BELT HOOK.

No. 253,423.　　　　　　　Patented Feb. 7, 1882.

Witnesses.
C. L. Burdett
W. Marsh

Inventor.
Alfred B. Pitkin
By W. E. Simonds

UNITED STATES PATENT OFFICE.

ALFRED B. PITKIN, OF HARTFORD, CONNECTICUT.

BELT-HOOK.

SPECIFICATION forming part of Letters Patent No. 253,423, dated February 7, 1882.

Application filed July 29, 1881. (No model.)

*To all whom it may concern:*

Be it known that I, ALFRED B. PITKIN, of Hartford, in the county of Hartford and State of Connecticut, have invented a certain new and useful Improvement in Belt-Hooks, of which the following is a description, reference being had to the accompanying drawings, where—

Figure 1:
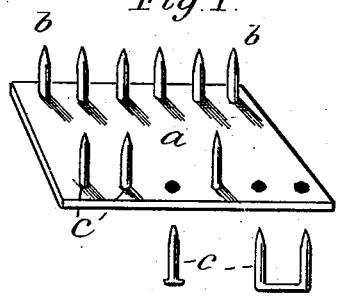
Figure 2:
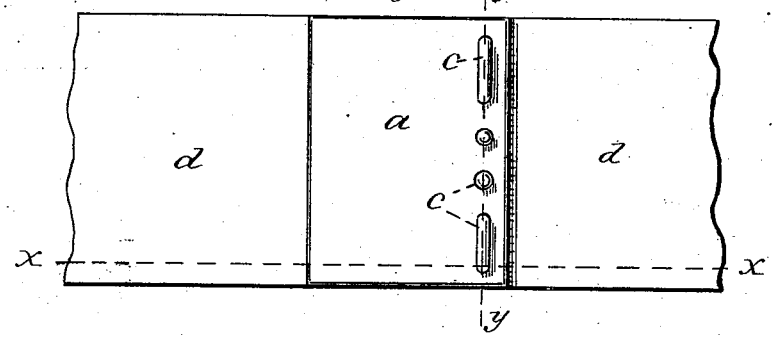
Figure 3:
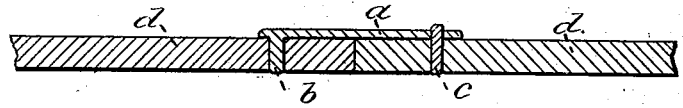
Figure 4:
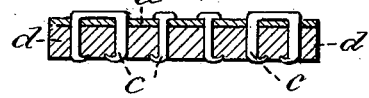

Figure 1 is a view of the under side of my improved belt-hook. Fig. 2 is a top view of a belt fastened by my hook. Fig. 3 is a view in longitudinal section through belt and hook, as denoted by line $x\ x$. Fig. 4 is a view in cross-section of belt and hook, as denoted by line $y\ y$.

My invention relates to that class of devices used for fastening together the ends of a belt to form a continuous band known as "belt-hooks;" and it consists of a plate with both fixed and removable teeth.

I am aware that plates with fixed teeth and that double plates riveted to opposite faces of the belt have been used; but the preference of the trade for the one plate having fixed teeth, (generally cast with the plate,) is marked, and the advantages of this form are decided. From its construction and the method in which it is used, the teeth being driven through the belt and turned down so that the points are buried in the belt, it can be used but once, and that forms one disadvantage. Another appears when a belt fastened by such a hook becomes loose and requires taking up, as in that case a strip must be cut from both ends of the belt and in width equal to the width of the hook. This limits the least distance of adjustment by taking up to the width of the hook, and prevents its use on some kinds of belting—as, for instance, wire and canvas fabric.

In the accompanying drawings, the letter $a$ denotes a belt-hook plate having on one edge the fixed teeth $b$ and near the opposite edge holes for the insertion of removable teeth $c$. The letter $d$ denotes belt shown in Figs. 2 and 3 as fastened by my improved hook.

I use single or double pointed teeth, but prefer the latter as a more convenient form of removable tooth.

When it is necessary to take up a belt fastened by my improved hook the heads of the removable teeth are cut off with a cold-chisel or pliers, the body of the teeth drawn from the inner side of the belt, a strip of the belt of the required width cut off, and the ends of the belt butted, as before, under the hook. New teeth are now inserted in the holes in the plate, driven through, and riveted or turned over so as to take a firm hold of the fabric of the belt.

I claim as my invention—

1. The combination of the belt-hook plate $a$, having permanent teeth $b$ on one edge and holes or perforations at its opposite edge, with the removable teeth $c$, all substantially as described, and for the purpose set forth.

2. The combination of the belt-hook plate $a$, having permanent teeth $b$ on one edge and holes or perforations at its opposite edge, with the removable double teeth $c$, all substantially as described, and for the purpose set forth.

ALFRED B. PITKIN.

Witnesses:
C. L. BURDETT,
GEO. W. LARAWAY.